(12) United States Patent
Barnett et al.

(10) Patent No.: US 8,271,643 B2
(45) Date of Patent: *Sep. 18, 2012

(54) METHOD FOR BUILDING ENTERPRISE SCALABILITY MODELS FROM PRODUCTION DATA

(75) Inventors: Paul T. Barnett, Collin County, TX (US); Timothy E. Wise, Austin, TX (US); Allan Drew Clarke, Austin, TX (US); Richard Gimarc, Austin, TX (US); James Reynolds, Mt. Desert, ME (US); Amy Spellmann, Johnson City, TX (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/462,547

(22) Filed: Aug. 5, 2009

(65) Prior Publication Data

US 2010/0106478 A1 Apr. 29, 2010

Related U.S. Application Data

(63) Continuation-in-part of application No. 11/345,415, filed on Feb. 1, 2006, now Pat. No. 7,676,569.

(51) Int. Cl.
*G06F 15/173* (2006.01)
(52) U.S. Cl. ...................................... 709/224
(58) Field of Classification Search .............. 709/238, 709/231, 224, 223, 201, 206; 703/22, 21, 703/19, 17, 13; 719/328, 315, 311
See application file for complete search history.

(56) References Cited

U.S. PATENT DOCUMENTS

| | | | |
|---|---|---|---|
| 5,608,908 A | 3/1997 | Barghouti et al. | |
| 5,768,261 A | 6/1998 | Brownmiller et al. | |
| 5,907,696 A | 5/1999 | Stilwell et al. | |
| 5,974,572 A | 10/1999 | Weinberg et al. | |
| 6,134,514 A | 10/2000 | Lie et al. | |
| 6,278,966 B1 | 8/2001 | Howard et al. | |
| 6,519,714 B1 | 2/2003 | Sweet et al. | |
| 6,560,569 B1 | 5/2003 | Abu El Ata | |
| 7,412,371 B2 | 8/2008 | Fisher et al. | |
| 7,533,008 B2 | 5/2009 | Mangino et al. | |
| 7,865,410 B1* | 1/2011 | Chandrupatla et al. | 705/30 |
| 2002/0053043 A1* | 5/2002 | Friedman et al. | 714/25 |
| 2002/0087378 A1 | 7/2002 | Como | |
| 2002/0087379 A1 | 7/2002 | Como | |
| 2002/0099813 A1 | 7/2002 | Winshell | |
| 2002/0188485 A1 | 12/2002 | Benny et al. | |
| 2002/0188493 A1 | 12/2002 | Benny et al. | |

(Continued)

FOREIGN PATENT DOCUMENTS

EP 000674279 9/1995

*Primary Examiner* — Emmanuel L Moise
*Assistant Examiner* — Charles Murphy
(74) *Attorney, Agent, or Firm* — Schultz & Associates, P.C.

(57) ABSTRACT

The invention provides a method for preparing a discrete event simulation model of a production network including a client and a plurality of servers on a plurality of network tiers connected by a network comprising the steps of executing a business function from the client on the production network, gathering resource data from the plurality of servers, normalizing the resource data, calculating a consumption of resources used by the plurality of servers, estimating a transaction cost associated with the consumption of resources and building a discrete event simulation model from the transaction cost.

20 Claims, 7 Drawing Sheets

U.S. PATENT DOCUMENTS

| | | |
|---|---|---|
| 2002/0188739 A1 | 12/2002 | Benny et al. |
| 2002/0194179 A1 | 12/2002 | Siefert |
| 2002/0194329 A1 | 12/2002 | Alling et al. |
| 2003/0084155 A1* | 5/2003 | Graupner et al. ............. 709/226 |
| 2003/0130886 A1 | 7/2003 | Caleraro et al. |
| 2003/0140139 A1 | 7/2003 | Marejka et al. |
| 2003/0172145 A1 | 9/2003 | Nguyen |
| 2003/0236689 A1 | 12/2003 | Casati et al. |
| 2004/0015382 A1 | 1/2004 | Baca et al. |
| 2004/0034555 A1 | 2/2004 | Dismukes et al. |
| 2004/0088417 A1 | 5/2004 | Bober et al. |
| 2004/0093244 A1 | 5/2004 | Hatcher et al. |
| 2004/0103186 A1 | 5/2004 | Casati et al. |
| 2004/0133347 A1 | 7/2004 | Britt |
| 2004/0138936 A1 | 7/2004 | Johnson et al. |
| 2004/0148047 A1 | 7/2004 | Dismukes et al. |
| 2004/0162626 A1 | 8/2004 | Farchmin et al. |
| 2005/0027727 A1* | 2/2005 | Garcea et al. ................. 707/100 |
| 2006/0013210 A1* | 1/2006 | Bordogna et al. ............ 370/389 |
| 2007/0061443 A1* | 3/2007 | Chavda ........................ 709/224 |

* cited by examiner

METHOD FOR BUILDING ENTERPRISE SCALABILITY MODELS FROM PRODUCTION DATA

CROSS-REFERENCE TO RELATED APPLICATIONS

This application is a Continuation-in-Part claiming priority to U.S. patent application Ser. No. 11/345,415 entitled "Method for Building Enterprise Scalability Models from Production Data" filed on Feb. 1, 2006, now U.S. Pat. No. 7,676,569.

TECHNICAL FIELD OF THE INVENTION

The technical field of this invention is software, namely, software to organize performance data from complex computer networks and servers and arrange it for input into a discrete event simulator.

BACKGROUND OF THE INVENTION

The performance of large computer networks and servers and the distributed applications run on them is an area of considerable interest to the global economy as businesses become more diverse and applications more complex. In order for network systems to remain reliable and available, system performance must be constantly monitored and tested. Additionally, maintaining performance during expansion of a network or the deployment of new servers and applications can be a considerable task.

Modern software applications are characterized by multiple components residing on multiple clients and servers or "tiers" connected by a network. Often a single network can support thousands of clients and servers and be widely geographically dispersed. These networks are known as "multi-tiered systems". In many cases, a multi-tiered system includes use of the Internet to request and receive data for enterprise applications.

An enterprise application typically provides a variety of business functions that users may execute. For example, an online banking application may allow a user to access databases at a bank and manipulate data to check account status or transfer funds between accounts. The user's task is known as a business function.

When a business function is executed, a sequence of transactions is performed by the enterprise application operating on the components on the network. Each transaction consists of a request for data (or "stimulus") and a reply. The request takes the form of packets of data. The request travels from a client through multiple tiers of servers on the network and returns as a reply. Along the way, each component processes the incoming request. Processing consumes local resources such as CPU time and disk reads and writes. Each component then transfers the request down the line of servers to a final database server. The database server retrieves the requested data and generates a reply in the form of data packets. The reply travels back through each server returning to the client to complete the business function. In addition, each component may generate other requests to other components resident on other servers on the network.

In order to maintain and improve system performance, system managers must understand the performance of the applications running on the system and be able to identify and predict current and future performance problems, and evaluate potential solutions to those problems. The performance of the system is measured by analyzing production data. Production data consists of performance metrics such as percent CPU usage for a given period of time, the number of accesses to a hard drive memory or the number of bytes of data transmitted through the network.

In the prior art, it is known to use discrete event simulators to aid in the analysis of network production data. A discrete event simulator is a software tool that is used to develop a detailed model of a multi-tiered system and applications developed on that system. One discrete event simulator known in the art is sold under the trademark "IPS" and is available from HyPerformix, Inc. of Austin, Tex.

FIG. 1 depicts how a prior art discrete event simulator is used in the system analysis. Resource utilization data 160 is derived from a set of deployed servers or a system under test 155. A discrete event model generator 165 is then used to create a discrete event model 170 of the processes running on the deployed servers or system under test 155. The discrete event model consists of a transaction flow, a simulation of resource consumption for each server, and the size of the data message received and sent during the operation. The discrete event model approximates and summarizes enterprise application transactions distributed over the network. In the prior art, the discrete event models have required very detailed analysis of production data requiring a time consuming process of defining transaction paths for many requests made by different applications simultaneously. A prior art simulation model typically takes weeks of time to complete.

The discrete event model forms a set of instructions to the discrete event simulator 170 used to simulate the execution of the business function. The discrete event simulation can then be analyzed and observed to perform basic capacity planning analysis for the network. CPU and disk behavior can be estimated as well as multi-tiered system behavior. By changing the model and reprogramming the simulator, predictions can be developed for future system load performance and planning.

Production data may be collected by software applications known as resource monitors. Examples of resource monitors include Tivoli I™, available from Tivoli, HP Measureware, available from Hewlett Packard of Palo Alto, Calif. and BMC PatrolPerform available from BMC.

The type of data collected by the resource monitors and the frequency of collection differ. For example, disk input/output data is often collected in terms of total numbers of reads and writes, total read bytes and total write bytes that occur during the monitoring period. CPU usage is usually collected in percentage of usage over time. The data is typically bulky with data files which are tens of megabytes to multiple gigabytes in size; the data can come from many sources. Another example is performance monitoring programs that collect data directly from various hardware devices such as CPU's and hard disk drives. The data is typically not isomorphic; that is the data can have many formats. It is not uncommon to have multiple production data files that are logically related. For instance, they may capture activity on different network segments which overlap. The files must be merged and synchronized in order to be useful.

In the prior art, the format in which typical resource monitors collect data hinders the modeling process. Data preparation analysis tools have been developed to aid in this process, however they do not support the ability for modeling a business functions utilizing more than one application nor do other modeling methodologies provide for modeling a business function running on more than one server.

Also in the prior art, the discrete element models developed have been far too detailed to allow analysis of production data to derive helpful predictions quickly.

In a particular piece of prior art to Abu, et al., U.S. Pat. No. 6,560,569 B1, a system is disclosed which is an input module, a construction module, performance metrics module and an output module to create an output several models of a proposed information design system. The input module receives descriptive input which is validated and transformed into quantitative output. This construction model uses the quantitative input and information from a library of hardware and software component models to create and calibrate one or more models. The performance metrics module calculates performance metrics for the modules, which can then be compared based on these metrics. However, the method is extremely time intensive requiring iterations at several points to verify and correct deficiencies in models created. Additionally, the method requires a database of component models which were designed by the information system designer which must determine the function of each subcomponent of each system before developing the models.

Therefore a need exists for analyzing and preparing production data quickly to allow for performance modeling and analysis of a network and for efficient production of discrete event models for discrete event simulations.

SUMMARY OF THE INVENTION

One object of the present invention is to provide for a method preparing a discrete event simulation model of a production network including a client and a plurality of servers on a plurality of network tiers connected by a network comprising the steps of executing a business function from the client on the production network, gathering resource data from the plurality of servers, normalizing the resource data, calculating a consumption of resources used by the plurality of servers, estimating a transaction cost associated with the consumption of resources and building a discrete event simulation model from the transaction cost.

It is another broad aspect of this invention to provide a computer program product adaptable for storage on a computer readable medium and operable for creating a discrete event simulation model comprising the program steps of gathering resource data from a plurality of resource monitors operatively disposed on a plurality of servers resident on a multi-tiered system executing a business function, wherein the resource data includes a reporting interval, a timestamp, a resource utilization, a received packet count and a sent packet count, equalizing at least one reporting interval in the resource data, synchronizing at least one time stamp in the resource data, normalizing at least one set of units in the resource data, calculating a resource consumption for the plurality of servers, calculating a transaction cost from the resource data, approximating a transaction flow for a plurality of transactions related to the business function, calculating a network throughput between the plurality of servers and building a discrete event simulation model from the transaction cost, the transaction flow and the network throughput.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present invention is described in terms of an apparatus and method for creating discrete event models from production data and estimating transaction cost for execution of business functions on multi-tiered systems. Persons skilled in the art, however, will recognize that any computer system that includes suitable programming means for operating in accordance with the disclosed methods also falls well within the scope of the present invention. Suitable programming means include any means for directing a computer system to execute the steps of the method of the present invention. The present invention also may be embodied in a computer program product, which is implemented by use of a recording medium for machine-readable information such as a diskette or other recording medium suitable for use with a data processing system. Although most of the exemplary embodiments described in this specification are oriented to software installed and executing on computer hardware, alternative embodiments may be implemented as firmware or as hardware and are within the scope of the present invention.

Figure 1:
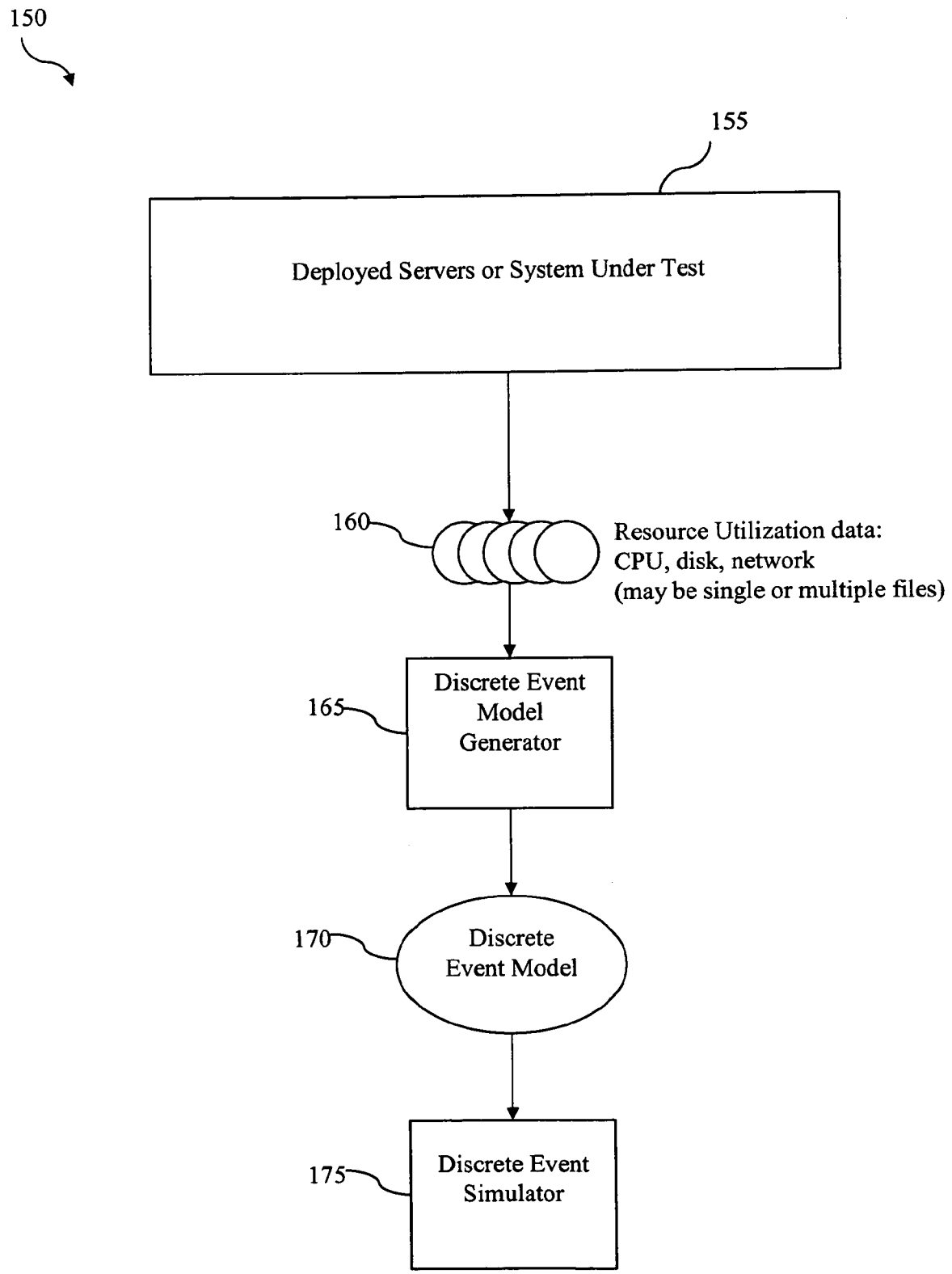
FIG. 1 is a block diagram illustrating the use of a prior art discrete event simulator.
Figure 2:
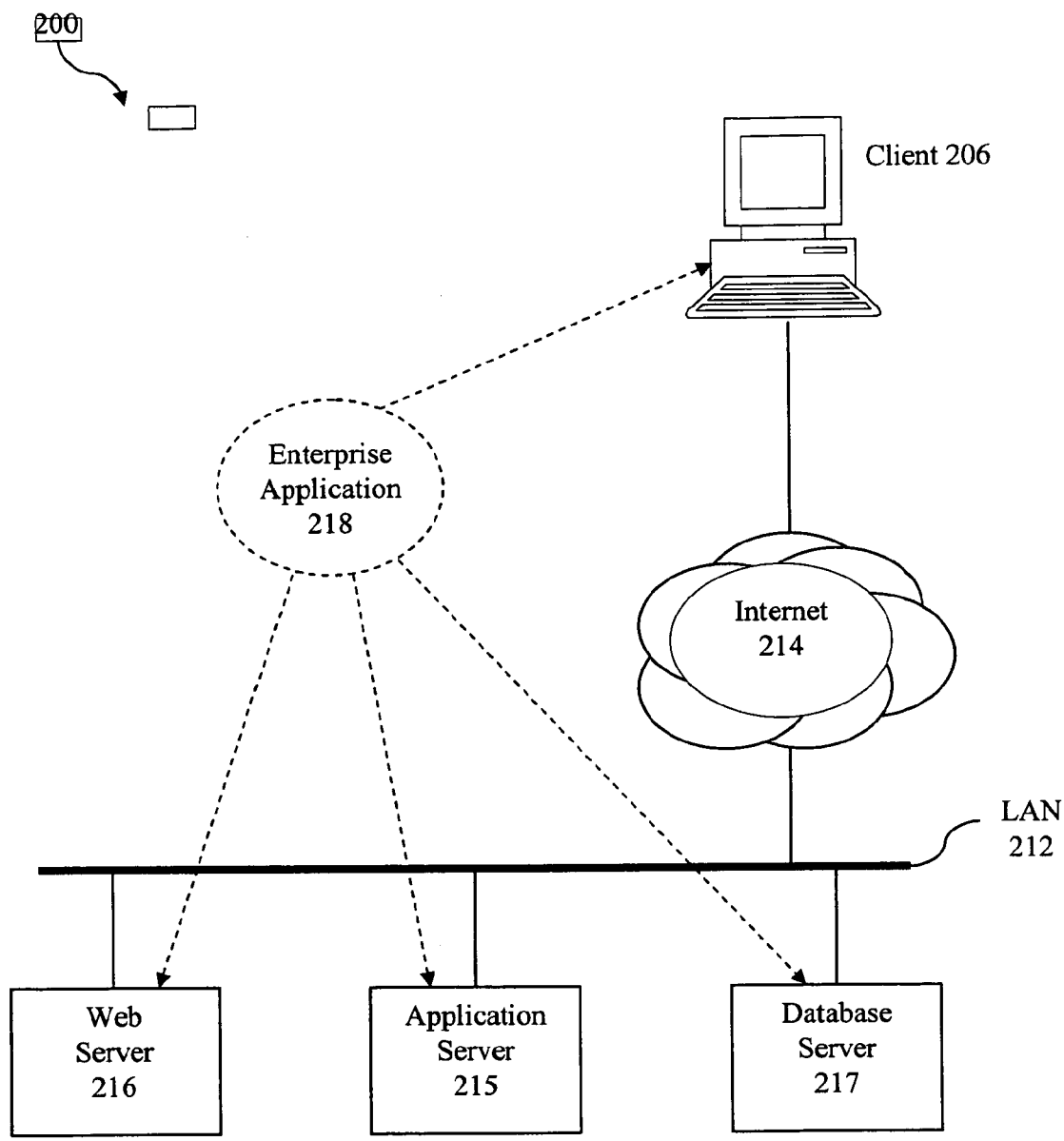
FIG. 2 is a block diagram illustrating an enterprise application deployed on a four-tier computer network.

Turning now to FIG. 2, illustrated is a network 200. In network 200, a user (not shown) operates a client 206. The client 206 executes an enterprise application 218 operating on servers over the network. Components of enterprise application 218 are resident on the application server 215, web server 216 and database server 217. In this example, the client is connected to the servers through Internet 214 and local area network 212. Of course, those skilled in the art will recognize that the networks involved may be local or wide area networks. Those skilled in the art will also recognize that each of the servers and clients can be multiple machines connected logically or a single machine with appropriate partitions.

The servers and network cooperate to provide the business function. For example, all of the servers play a part in providing a banking business function such as "transferring funds." In order to transfer funds the client initiates an activity from a browser resident on client 206 and transmits it through internet 214 to web server 216. Web server 216 is largely responsible for providing static content for the client such as unvarying text and images displayed for the client and conducting encryption and decryption services for secure data. Application server 215 is responsible for logically operating on the request to do calculations or otherwise manipulate data into file form and for requesting data from the database server.

Database server 217 is largely responsible for database operations including the alteration of data, recording of data and storage functions typical to databases. A directory server (not shown) may also be present and provide user authentication services over the network.

The operation of enterprise application 218 requires CPU usage, hard disk usage, and input/output from the network interface cards on each of servers 215, 216, 217 and on client 206. While processing the request, application server 216 may also receive requests for other business functions from other client computers via internet 214. As a result, application server 216 and additional servers 215 and 217 partition CPU usage, hard disk usage, and input/output from their network interface cards during the operation of enterprise application 218 in order to fulfill the requirements of any number of requests.

Figure 3:
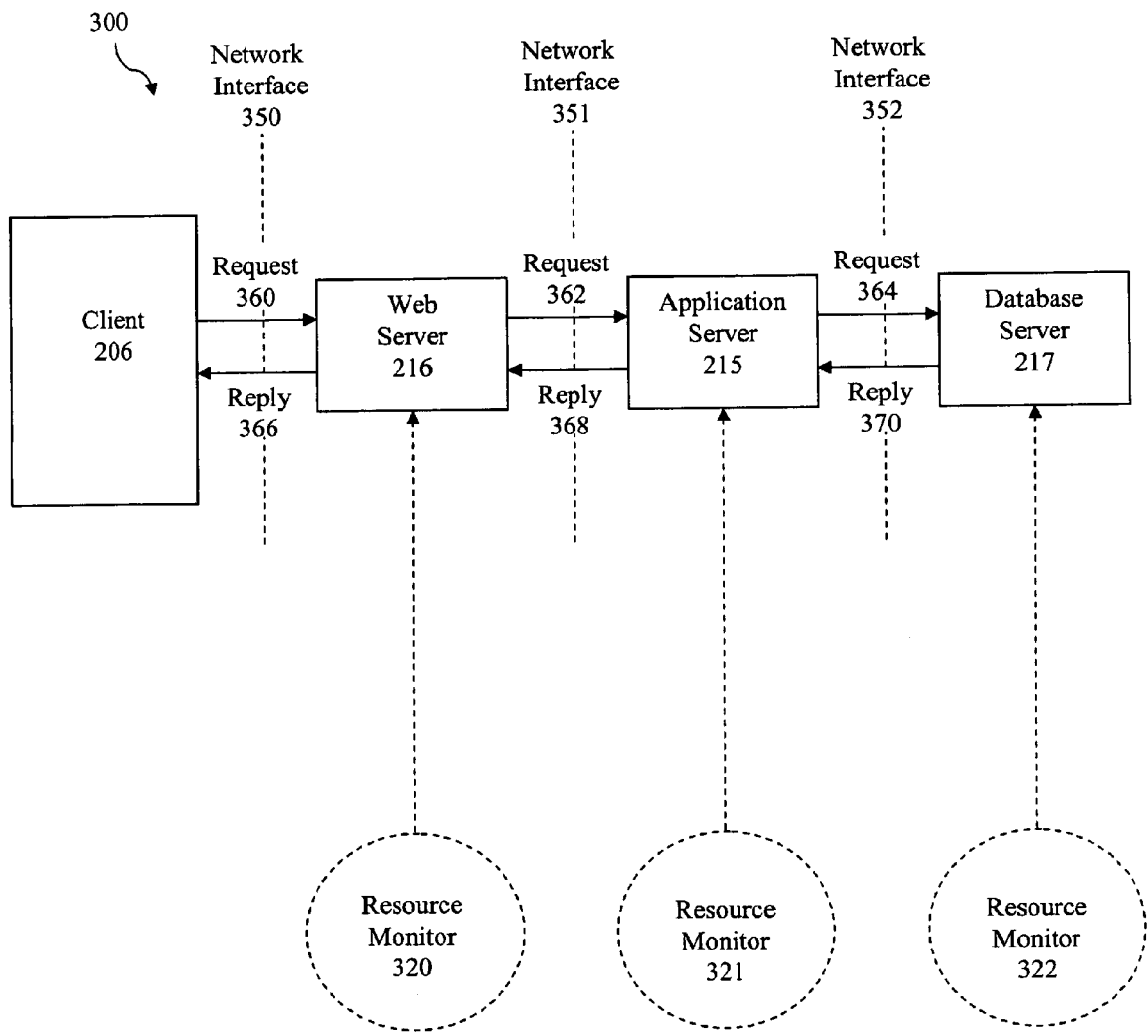
FIG. 3 is a block diagram illustrating the deployment of a set of resource monitors deployed on a four-tier computer network and logical network communication paths between the tiers of the present invention.

FIG. 3 shows client 206 making a request for information from database server 217. In the process, client 206 must communicate a request in the form of a series of bytes transmitted through a network to web server 216. Web server 216 operates on the request and transmits it to application server 215 which in turn operates on the request and transmits it to database server 217. Database server 217 gathers data and replies to application server 215, which in turn replies to web server 216, which in turn replies to client 206 through the paths shown. Each of the requests can and often does contain different numbers of bytes transmitted at different times containing different messages between the tiers on the network.

Resource monitors 320, 321 and 322 resident on web server 216, application server 215 and database server 217.

Figure 4:
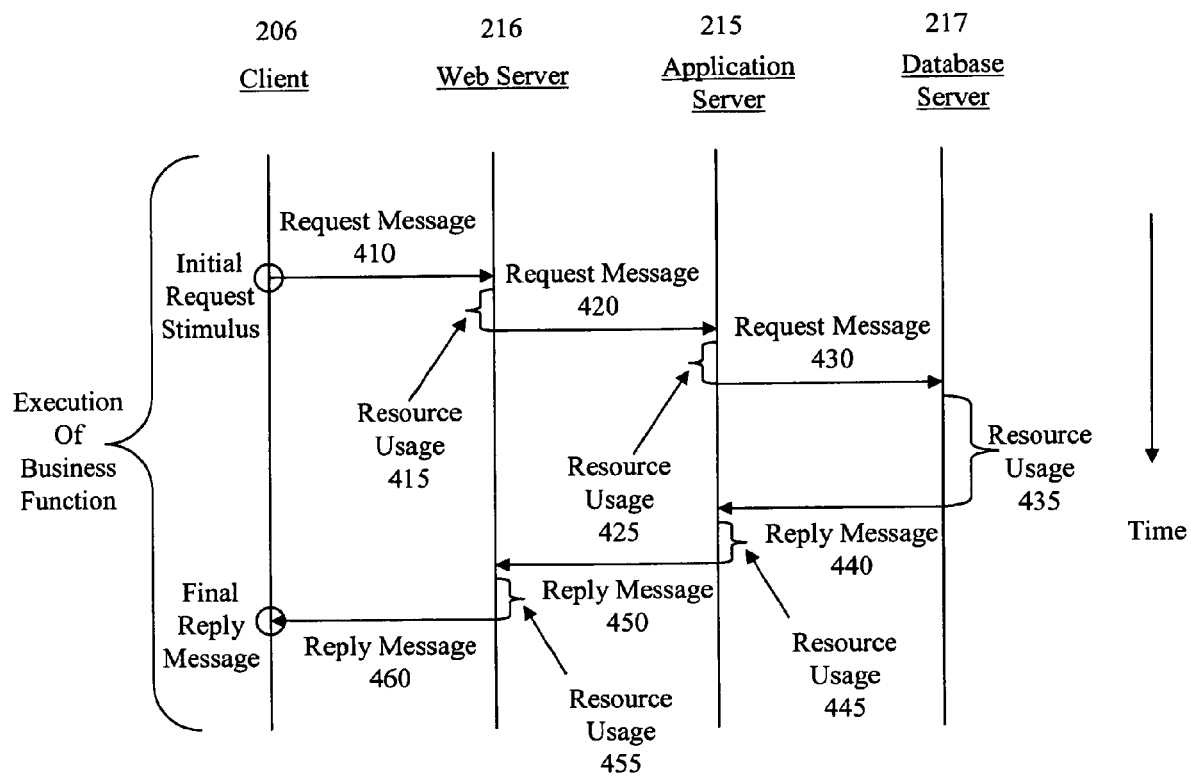
FIG. 4 is a schematic representation of the execution of a business function on a network system.

Turning to FIG. 4, a schematic diagram is shown showing execution of a business function between different network tiers. The vertical lines in FIG. 4 represent boundaries between tiers for components resident on servers on the network. Specifically, client 206, web server 216, application server 215 and database server 217. Time progresses from the top of the diagram to the bottom. During execution of a business function an initial request stimulus is made by client 206 the request includes a request message which is transmitted from client 206 to web server 216. The request includes a packet of data containing a certain number of bytes. When the request message is received by web server 216 it operates on that request and consumes a certain resource usage 415. That resource usage can include CPU utilization, disk read operations and disk write operations. Web server 216 then transfers a request message to application server 215 over the network including a message of a certain length of bytes 420. Resource usage 425 is required by application server to operate on the request. Application server 215 then transfers a request message 430 to database server 217 in a certain number of bytes. Database server 213 operates on the message requiring resource usage 435. The length of the delay between receipt of a request message and transmission of the request to a different tier is signified by the distance proportional to the delay required.

After the source usage 435 database server generates a reply message of a certain length of bytes 440 and transmits it back to application server 215. Application server 215 again utilizes resources 445 and generates a reply message 450 of a certain length of bytes to be sent web server 216.

Web server 216 receives the reply message and utilizes resources 455 to generate a reply message 460 which is then sent back to client 206 completing the execution of the business function.

A shown in FIG. 3, resource monitors 320, 321 and 322 are software tools which typically monitor resource utilization on servers such as CPU utilization, network utilization such as bytes sent and received on a network interface card and disk utilization, such as disk operations and bytes from read or write operations. The resource monitors generate resource utilization reports for each server under observation. A typical resource utilization report is shown in Table 1 below.

TABLE 1

| Date | Time | System Name | CPU Utilization | Disk Read Ops/sec | Disk Read Bytes/sec | Disk Write Ops/sec | Disk Write Bytes/sec | Network Bytes Sent/sec | Network Bytes Received/sec |
|---|---|---|---|---|---|---|---|---|---|
| 2005-1-1 | 13:20:00 | Web | 15.0% | 10 | 30,294 | 2.3 | 10,358 | 3,390 | 8,592 |
| 2005-1-1 | 13:21:00 | Web | 5.0% | 7 | 40,033 | 21.5 | 209,039 | 0 | 0 |
| 2005-1-1 | 13:22:00 | Web | 45.0% | 25 | 103,003 | 10.2 | 95,085 | 6,300 | 10,385 |
| 2005-1-1 | 13:23:00 | Web | 35.0% | 20 | 85,938 | 7.9 | 75,395 | 2,390 | 7,699 |

The data in Table 1 was produced from the resource monitor sold under the trademark "OpenView Performance Agent" available from Hewlett Packard, of Palo Alto, Calif. In this example, the report includes data collected at one-minute time intervals, time stamping the measurements of the production data at the beginning of each minute.

Other resource monitors, such as Microsoft Performance Monitor, record data in a less consistent manner as shown in Table 2 below.

TABLE 2

| Date | Time | System Name | CPU Utilization | Disk Read Ops/sec | Disk Read Bytes/sec | Disk Write Ops/sec | Disk Write Bytes/sec | Network Bytes Sent/sec | Network Bytes Received/sec |
|---|---|---|---|---|---|---|---|---|---|
| 2005-1-1 | 13:20:35 | web | 15.3% | 10.2 | 30,294 | 2.3 | 10,358 | 3,390 | 8,592 |
| 2005-1-1 | 13:21:05 | web | 5.1% | 7.3 | 40,033 | 21.5 | 209,039 | 0 | 0 |
| 2005-1-1 | 13:21:35 | web | 45.2% | 30.9 | 103,003 | 10.2 | 95,085 | 6,300 | 10,385 |
| 2005-1-1 | 13:22:05 | web | 35.3% | 25.0 | 85,938 | 7.9 | 75,395 | 2,390 | 7,699 |

In the example in Table 2, the first timestamp reported is when the resource monitor program is first started. Subsequent measurements are made at an interval specified by user of the program. In this example, the sampling interval was 30 seconds with timestamping at the beginning of each 30-second period. Other resource monitoring tools record measurements with inconsistent intervals. For example, these performance monitors will wait for a specified interval, make a measurement, and then wait for a specified interval again without taking into account the time required to collect and record the measurements. As a result, the measurement interval is longer than that reported and may vary from interval to interval.

Figure 5:
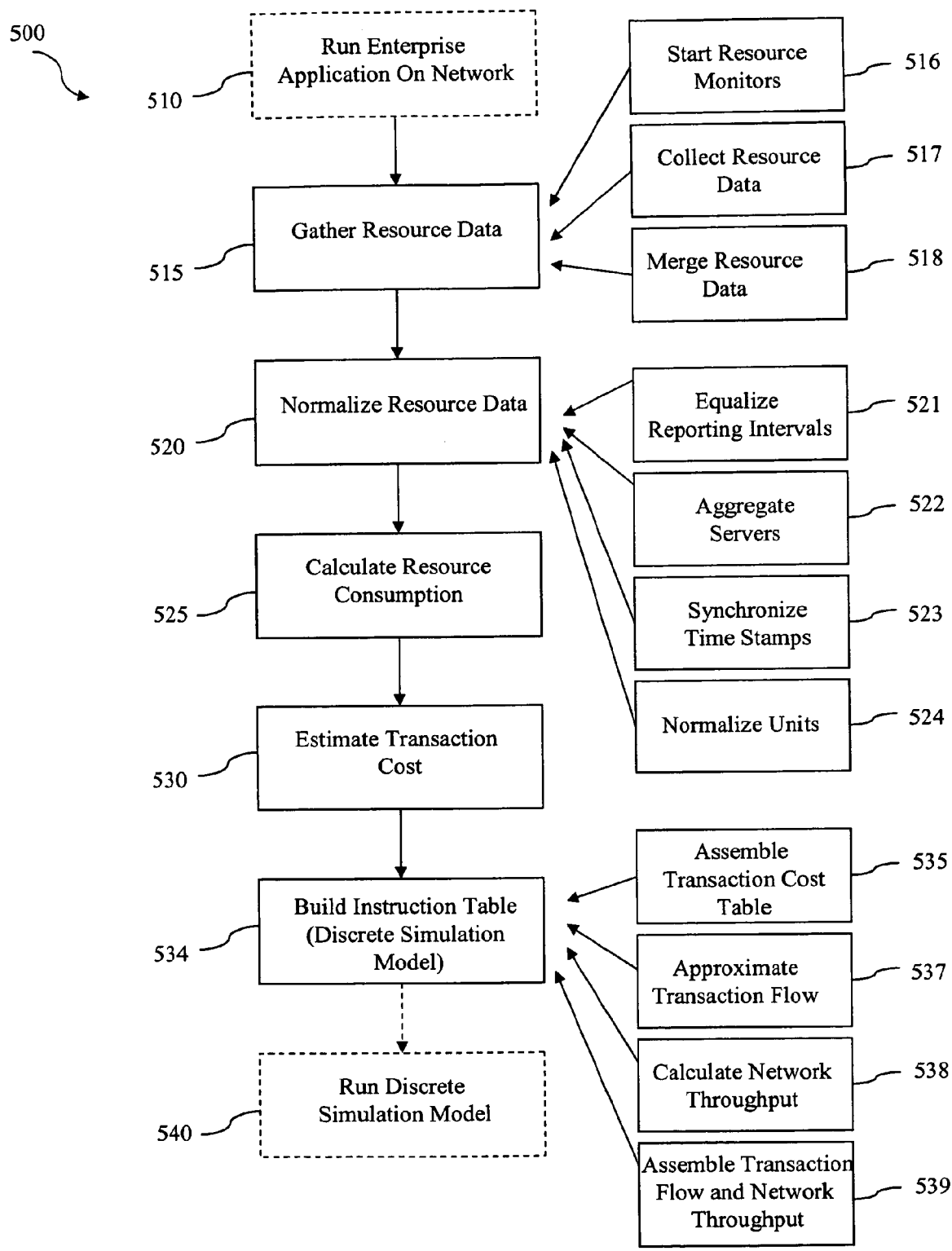
FIG. 5 is a block diagram depicting the methodology of one embodiment of the present invention.

FIG. 5 shows a preferred embodiment of the method steps of the current invention. At step 510, an enterprise application is run on a set of deployed servers or system under test. The use of an enterprise application on the network will result in production data on each of the servers resident on the network.

At step 515, production data is gathered by resource monitors which are resident on each server on the system under test. The step of gathering requires that all servers be synchronized in time. Time clocks can be synchronized by known tools which align the clocks of each server. The step of gathering resource data also requires that each of the resource monitors be properly invoked at step 516 and that proper production data be collected at step 517. A data file is provided by each resource monitor. The files are copied into a central location. In the preferred embodiment a separate analysis computer is used so as not to effect the network environment. At the central location the data files from the resource monitors are synchronized and merged into a single table at step 518.

At step 520, the resource data gathered in step 515 must be normalized. In order to normalize the resource data several problems must be addressed.

The resource monitoring reporting intervals must be equalized at step 521. For example, if one resource monitor reports data every sixty (60) seconds and another reports every thirty (30) seconds, the latter will generate twice as many measurements as the former, leading gaps in the merged data file as follows:

TABLE 3

| Date | Time | Web Server CPU Utilization % | App Server CPU Utilization % | Web Server Rate Data Ops/sec | App Server Rate Data Ops/sec |
| --- | --- | --- | --- | --- | --- |
| 2005-1-1 | 00:00:00 | 10.0 | 20.0 | 100 | 500 |
| 2005-1-1 | 00:00:30 | ? | 25.0 | ? | 500 |
| 2005-1-1 | 00:01:00 | 15.0 | 30.0 | 300 | 500 |
| 2005-1-1 | 00:01:30 | ? | 20.0 | ? | 500 |

In order to correct for the inconsistency in reporting intervals, data is extrapolated in the merged table to report the same utilization during the measurement interval. With respect to data reported in percent utilization, such as CPU Utilization it is presumed that the percentage utilization for each unreported period is the same as in the preceding period. With respect to rate data such as Bytes Transmitted Per Second or Operations Per Second it is presumed that the rates remain the same for the non-reported period as they were in the previous period. Table 4 illustrates the results of the extrapolation process for this example.

TABLE 4

| Date | Time | Web CPU Utilization | App CPU Utilization | Web Server Rate Data Ops/sec | App Server Rate Data Ops/sec |
| --- | --- | --- | --- | --- | --- |
| 2005-1-1 | 00:00:00 | 10.0 | 20.0 | 100 | 500 |
| 2005-1-1 | 00:00:30 | 10.0 | 25.0 | 100 | 500 |
| 2005-1-1 | 00:01:00 | 15.0 | 30.0 | 300 | 500 |
| 2005-1-1 | 00:01:30 | 15.0 | 20.0 | 300 | 500 |

A similar problem is encountered in reconciling data from resource monitors which report asynchronous or random measurement intervals. An example is shown in Table 5. In this example the resource monitor reports data at ninety (90) second intervals beginning at time 00:20.

TABLE 5

| Date | Time | Web CPU utilization | App CPU utilization |
| --- | --- | --- | --- |
| 2005-1-1 | 00:00:15 | 10.0 | ? |
| 2005-1-1 | 00:00:20 | ? | 20.0 |
| 2005-1-1 | 00:00:45 | 15.0 | ? |
| 2005-1-1 | 00:01:50 | ? | 20.0 |

The differing measurement intervals can be compensated for by copying previous utilization reported into the time interval from one resource interval into the non-reported interval for the other resource tool. A common time synchronization is required. Therefore, data preceding the earliest reported data for any server under test is dropped from consideration. In the example of Table 6, all entries before 00:20 are dropped because the application server CPU utilization for that time interval is the first reported data. Table 6 shows the results of execution of this step in for this example.

TABLE 6

| Date | Time | Web CPU utilization | App CPU utilization |
| --- | --- | --- | --- |
| 2005-1-1 | 00:00:20 | 10.0 | 20.0 |
| 2005-1-1 | 00:00:45 | 15.0 | 20.0 |
| 2005-1-1 | 00:01:50 | 15.0 | 20.0 |

Figure 6A:
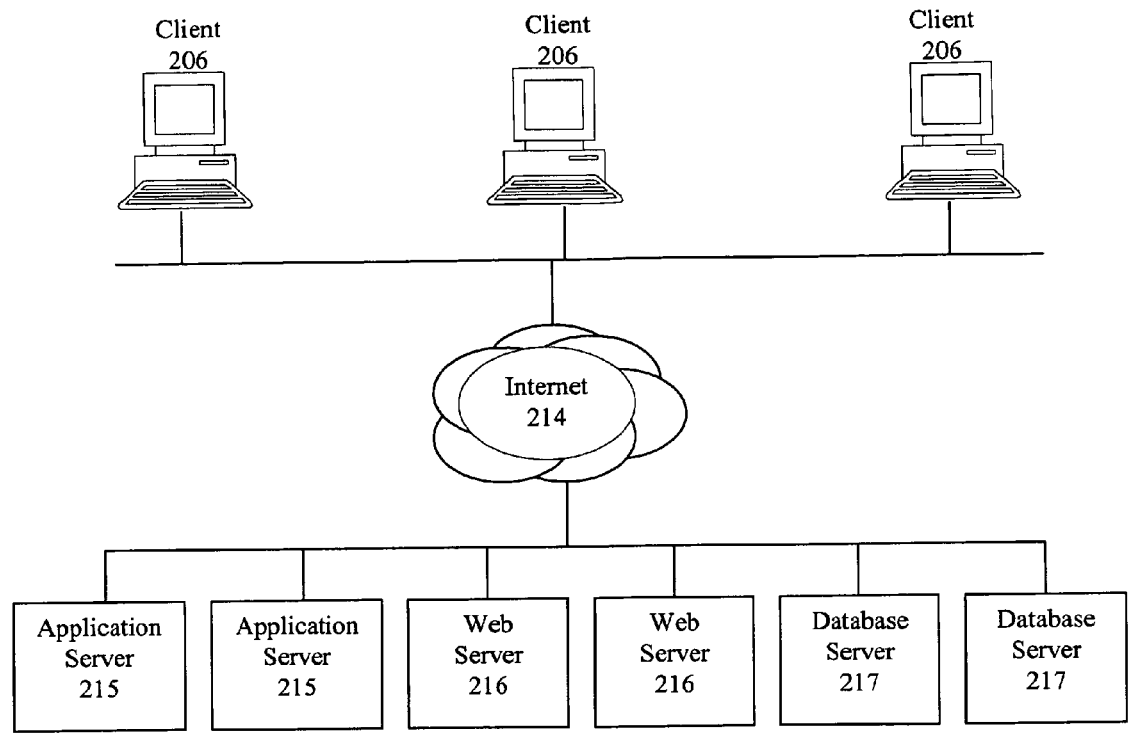
FIG. 6 is a block diagram of a non-aggregated linear multi-tiered system.
FIG. 6b is a block diagram of an aggregated multi-tiered system.
Figure 6B:
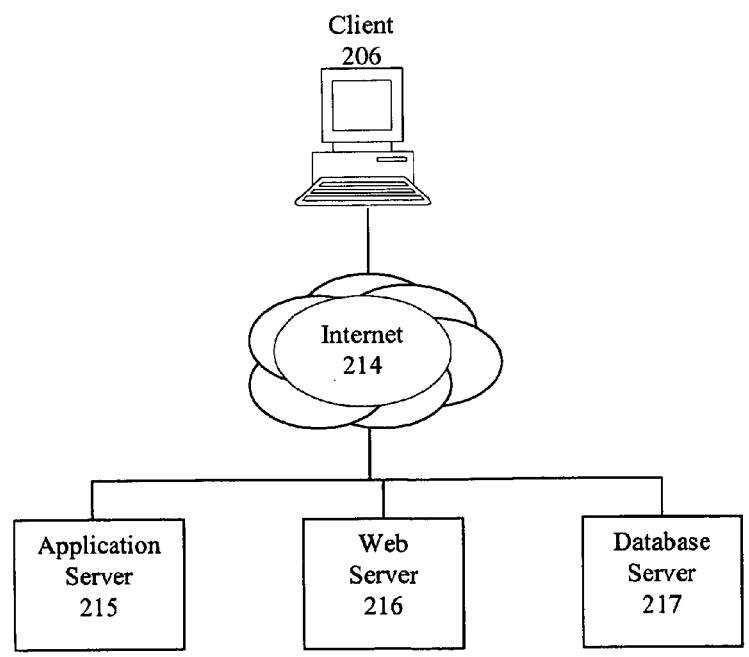

Normalizing the production data also requires that multiple servers that perform the same function and share the same load be aggregated into a single megaserver for purposes of calculating transaction cost at step 522. A multi-tiered system may have more than one client and server on each tier as shown in FIG. 6a. Resources at each tier are aggregated into a single machine on each tier resulting in a simplified system as shown in FIG. 6b. In order to aggregate servers, server measurements are adjusted to account for differences in performance. For example, CPUs with different performance characteristics are normalized so that all utilizations represent a consistent CPU performance. An example of this adjustment is adjusting the number of operations per second to a consistent rate. As another example, servers which contain different numbers of CPU's have CPU time distributed over the number of CPU's to arrive at a single CPU measurement.

Returning to FIG. 5, normalization also requires that data from resource monitors that time stamp measurements at the end of a measurement interval be adjusted so that time stamps are consistently at the beginning of each interval at step 523.

Additionally, normalization requires that units be consistent, at step 524, such as changing kilobytes to bytes and per minute to per second measurement.

Moving to step 525, the method of the preferred embodiment calculates resource consumption for each tier on the network over a discrete measurement time period. Resource measurements are usually expressed in "utilization" or rates. Utilization is expressed as a percentage and is understood to be the percentage of the resource that was in use during the measurement period.

Rates are typically given in units of operations per time where operations can be transactions, bytes, reads, writes or other discrete events that can be accumulated.

The generalized calculation is:

(resource utilization during measurement period)*
  (length of measurement period)=(resource consumption)

For example, resource consumption for 10% CPU utilization might be calculated for a 30-second time interval as follows:

(10% CPU utilization)*(00:00:45−00:00:15)=0.10*30 seconds=3 seconds

As another example, resource consumption for a rate of 5 disk reads per second for a 30 second time interval might be calculated as follows:

(5 disk reads/second)*(00:00:45−00:00:15)=5*30 seconds=150 disk reads

If the period over which data is analyzed is longer than the measurement interval at which the resource utilization is sampled, then each calculation must be repeated for each measurement interval within the desired time period from which the model is being derived and accumulated in a running total. The accumulated running total yields a total resource consumption during the period over which data is analyzed.

Moving to step 530, the method provides an estimation of transaction cost.

A discrete event simulator requires as input resource consumption to be expressed in resource utilization (or transaction cost) for each individual stimulus or event (or transaction).

The generalized calculation is as follows:

(Resource consumption)/(transactions performed during measurement time period)=(transaction cost)

There are several sources from which to derive the number of transactions completed during the measurement period. For example, transaction counts can be reported by an application during the measurement period. Transaction logs generated by the application during the measurement period can also be used. An example of transaction log is a web server log. Transaction counts can also be reported by a load test generator. An example of a load test generator application is a program of "LoadRunner" available from Mercury Interactive. An additional source of the number of transactions is estimates provided by the user familiar with the application and the number of transactions completed during the measurement period.

Once the transaction count is known, each measured resource usage is divided by this discrete number to arrive at a per-transaction resource consumption estimate. For example, if a resource consumption for a CPU utilization is three (3) seconds and the transactions performed during the measurement period is 300, the transaction cost in CPU seconds is 0.01.

The general calculation is carried out for each measured resource on each server for the system and built into a table such as the following example in Table 7:

TABLE 7

| Server Name | CPU seconds | Disk Read Operations | Disk Write Operations | Disk Bytes Read | Disk Bytes Written | Network Bytes Sent | Network Bytes Rcvd |
|---|---|---|---|---|---|---|---|
| web | 0.010000 | 10 | 1 | 5,120 | 512 | 100,000 | 50,000 |
| app | 0.030000 | 5 | 0 | 1,280 | 0 | 75,000 | 125,000 |
| database | 0.020000 | 100 | 200 | 65,000 | 100,000 | 40,000 | 65,000 |

Moving to step 535, the method requires building instructions for a discrete simulation model. Instructions for discrete simulation model follows a transaction from a client through a set of servers as a request and returns to the client from the servers through a set of replies. During the transaction flow, each server consumes resources and transmits messages between other tiers on the network in the form of a number of bytes.

At step 535, building the instruction table for the discrete simulation consists of five substeps, construction of a table of transaction costs 535, aggregating multiple servers 536, approximating transaction flow 537, calculating network 538 and assembling the transaction flow and network throughput, step 539.

At step 535, the per-transaction resource consumption estimates are used in the construction of a table of transaction costs. For each transaction that is initiated the table of transaction costs is part of the instruction set to be used by the discrete event simulator to run the simulation model. It indicates how much CPU time is to be used by each server as well as the disk read and disk write time consumed for each transaction. An example is shown in Table 8:

TABLE 8

| Server Name | Resource consumption to be simulated |
|---|---|
| web | Consume 0.010 seconds of CPU |
| web | Perform 10 disk read operations, reading 512 bytes each time |
| web | Perform 1 disk write operation, writing 512 bytes each time |
| app | Consume 0.030 seconds of CPU |
| app | Perform 5 disk read operations, reading 256 bytes each time |
| database | Consume 0.020 seconds of CPU |
| database | Perform 100 disk read operations, reading 650 bytes each time |
| database | Perform 200 disk write operations, writing 500 bytes each time |

During construction of the table of transaction costs, multiple iterations of resource consumption can be added by the user to model certain physical aspects of the network system. For example, iterations of resource consumption can be provided to model a long data link between servers on a network.

For example, travel times of five to ten milliseconds produce a latency for networks where geographic distances between servers is high.

Figure 7:
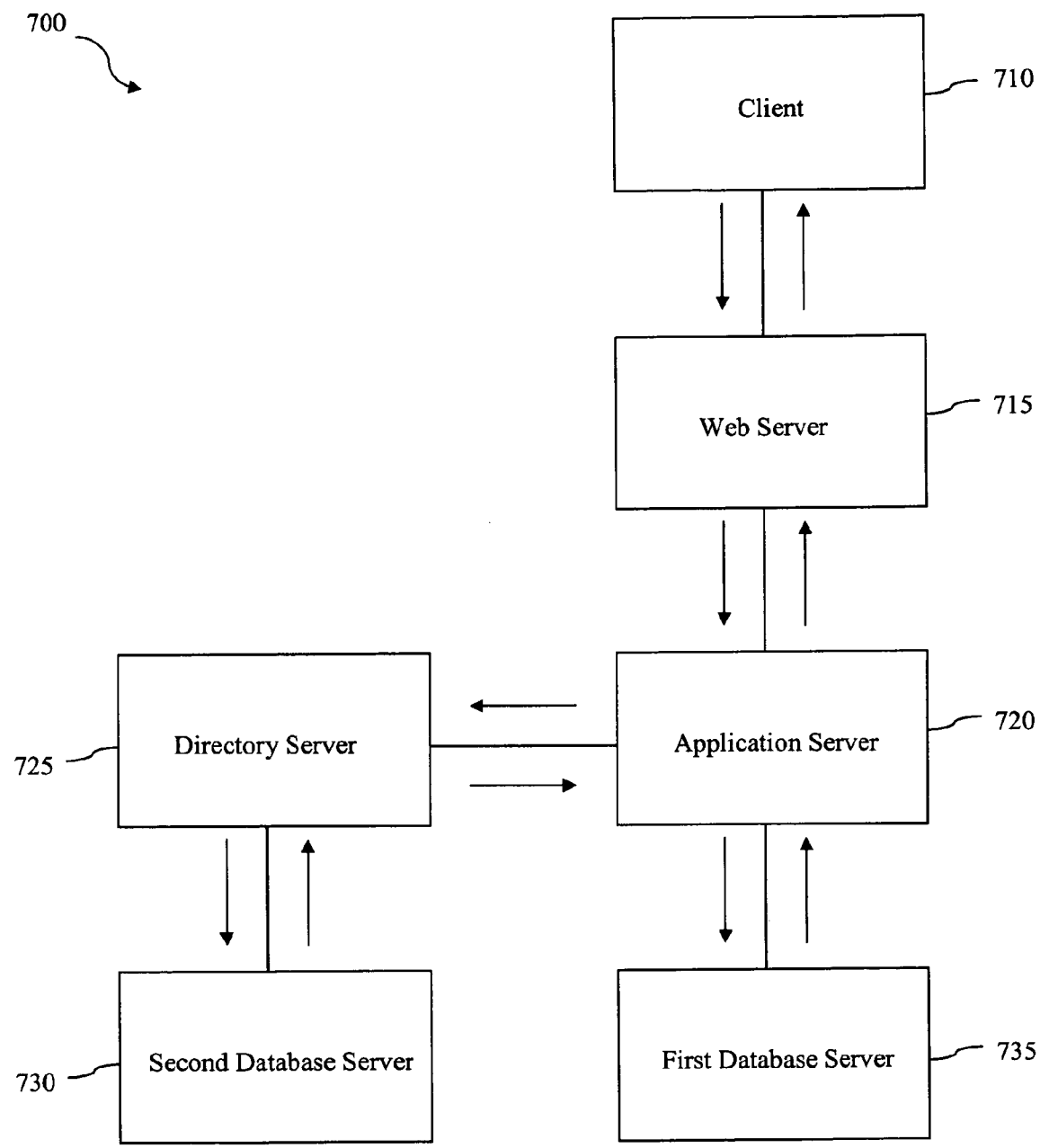
FIG. 7 is a block diagram of an aggregated non-linear multi-tiered system.

The discrete event simulator must generally also have provided a transaction flow before the model will function. Transaction flow can be linear or nonlinear. If a transaction flow is linear, transaction flow is assumed to have a single path along the network for message travel and return. An example of a linear system is shown at FIG. 3. If a transaction flow is non-linear, transaction flow is assumed to deviate on the network between different paths. An example of a non-linear system 700 is shown in FIG. 7.

At step 537, the transaction flow between and among the clients and servers on each tier of the network are approximated by the user. In a linear system, transaction flow is assumed to begin with the aggregate client, and flow from aggregate web server to aggregate application server to aggregate database server, in order, before returning replies on the same path in reverse order. Further, in all cases, all resource utilization is allocated to the server immediately after receipt of a request message. No resource allocation is allocated to any server during the reply from the database server to the client. In the instant example, the transaction flow steps are added to the instructions for the discrete event simulator table built in the previous step as shown in Table 9.

TABLE 9

| Server Name | Resource consumption to be simulated |
| --- | --- |
| client | Send request to web server |
| web | Consume 0.010 seconds of CPU |
| web | Perform 10 disk read operations, reading 512 bytes each time |
| web | Perform 1 disk write operation, writing 512 bytes each time |
| web | Send request to application server |
| app | Consume 0.030 seconds of CPU |
| app | Perform 5 disk read operations, reading 256 bytes each time |
| app | Send request to database server |
| database | Consume 0.020 seconds of CPU |
| database | Perform 100 disk read operations, reading 650 bytes each time |
| database | Perform 200 disk write operations, writing 500 bytes each time |
| database | Send reply to app server |
| app | Send reply to web server |
| web | Send reply to client |

In a non-linear system, such as that shown in FIG. 7, the transaction flow begins with client 710 and travels to web server 715 and application server 720. However, transaction flow then may take alternate paths. It may travel to directory server 725 and secondary database server 730 before returning to application server 720. Alternatively, it may travel directly to first database server 735. In either case, the reply path then travels from first database server 735 back to application server 720, web server 715 and client 710. The model must account for each of the alternate paths.

The method accounts for each alternate path by statistically accounting for both possibilities. An iteration count probability is assumed between the alternate paths to directory server 725 and database server 735. A statistical value is chosen to represent the number of times each path is chosen for each individual stimulus supplied by the client. Consumption of resources is then allocated equally among the iterations.

For example, given a business function in which application server 720 is called once, server 720 would call directory server 725 20% of the time and first database server 735 80% of the time. The simulation is run for a sufficient period of time so that on average there are 20 calls to directory server 725 and 80 calls to database server 735.

As another example, given a business function in which application server 720 is called once, server 720 would call directory server 725 520% of the time and first database server 735 280% of the time. The simulation is run for a sufficient period of time so that on average there are 520 calls to directory server 725 and 280 calls to database server 735.

As another example, if the percentage of usage of the directory server data is 20%, then one iteration will be supplied in the model from application server 720 to directory server 725 and four iterations will be supplied in the model for the path from application server 725 to database server 735. For this example, the simulation table built is shown in table 10 below.

TABLE 10

| Server Name | Resource consumption to be simulated |
| --- | --- |
| Client | Send request to web server |
| Web | Consume 0.010 seconds of CPU |
| Web | Perform 10 disk read operations, reading 512 bytes each time |
| Web | Perform 1 disk write operation, writing 512 bytes each time |
| Web | Send request to application server |
| App | Consume 0.030 seconds of CPU |
| App | Perform 5 disk read operations, reading 256 bytes each time |
| App | Send request to directory server |
| directory | Consume resources |
| directory | Send request to database 2 server |
| Database 2 | Consume resources |
| Database 2 | Send request to directory server |
| directory server | Send reply to app server |
| App | Send request to database server |
| Database 1 | Consume 0.004 seconds of CPU |
| Database 1 | Perform 20 disk read operations, reading 650 bytes each time |
| Database 1 | Perform 40 disk write operations, writing 500 bytes each time |
| Database 1 | Send reply to app server |
| App | Send request to database server |
| Database 1 | Consume 0.004 seconds of CPU |
| Database 1 | Perform 20 disk read operations, reading 650 bytes each time |
| Database 1 | Perform 40 disk write operations, writing 500 bytes each time |
| Database 1 | Send reply to app server |
| app | Send request to database server |
| Database 1 | Consume 0.004 seconds of CPU |
| Database 1 | Perform 20 disk read operations, reading 650 bytes each time |
| Database 1 | Perform 40 disk write operations, writing 500 bytes each time |
| Database 1 | Send reply to app server |
| app | Send request to database server |
| Database 1 | Consume 0.004 seconds of CPU |
| Database 1 | Perform 20 disk read operations, reading 650 bytes each time |
| Database 1 | Perform 40 disk write operations, writing 500 bytes each time |
| Database 1 | Send reply to app server |
| App | Send reply to web server |
| Web | Send reply to client |

In the case of non-linear systems, the percentage of time chosen for each path can then be tested against observed behavior of the system and modified during successive implementation of the model to more closely approximate system behavior.

The discrete event simulator must also have provided the size of the message or network throughput for each request and reply for each transaction. Returning to FIG. 5 and moving to step 538, the method calculates the network throughput for the network interfaces for each transaction.

Data packets used in the construction of the requests and replies for each transaction is reported for each server by the resource monitors. However, "network throughput" reported by each server must be calculated carefully because every byte transferred between two servers is reported twice, once by the sending server and once by the receiving server assuming that resource monitors have collected information for each server independently.

Referring again to FIG. 3 data throughput at network interface 350, 351 and 352 must be calculated. Network interface 350 occurs between client 206 and web server 216, network interface 351 occurs between web server 216 and application server 215. Network interface 352 occurs between application server 215 and database server 217. Resource monitor 320 records "bytes sent" by web server 216 as the number of bytes sent in reply 366 and request 362. Similarly, resource monitor 320 records "bytes received" as the bytes included in request 360 and reply 368.

Resource monitor 321 records "bytes received" by application server 215 and the bytes in request 362 and reply 370. Resource monitor 321 records the "bytes sent" by application server 215 as an aggregation of the bytes in reply 368 and request 364. Resource monitor 322 records the bytes received by database server 217 as request 364. It also records the "bytes sent" by database server 217 as the bytes included in reply 370.

In order to arrive at the correct network interface throughput at network interface 350 and 351 the bytes counted twice must be eliminated. Using the bytes sent and received by the database server it is possible to account for the bytes sent and received by the application server. The actual number of bytes sent by the application server includes the number of bytes sent as reported by resource monitor 321 minus the number of bytes received as reported by resource monitor 322 (request 364). Similarly, the number of bytes received by application server 215 as seen at network interface 351 is equivalent to the number of bytes received as reported by resource monitor 321 minus the number of bytes sent as reported by resource monitor 322 (reply 370).

In a similar manner, the throughput at network interface 350 as reported by resource monitor 320 must take into account the data sent and received as reported by resource monitor 321.

The actual number of bytes sent by web server 216 as reported by the resource monitor 320 must have deducted from it the number of bytes sent to application server 215. Similarly, the number of bytes sent to web server 216 as reported by resource monitor 320 must have deducted from it the actual number of bytes sent from application server 215 to web server 216.

An example is helpful. For example, the following table shows the number of bytes sent and received as reported by the resource monitors attached to the appropriate web server, application server and database server as follows:

For example, after converting to actual bytes sent and received:

TABLE 11

| Server | Bytes Sent | Bytes Received |
|---|---|---|
| Web Server | 200,000 | 70,000 |
| App Server | 100,000 | 75,000 |

TABLE 11-continued

| Server | Bytes Sent | Bytes Received |
|---|---|---|
| Database Server | 50,000 | 10,000 |

We presume that:
  The client submits a request to the web server, and the web server submits a request to the application server to perform the transaction.
  During the processing of the transaction, the app server makes requests to read data from or write data to the database server. All persistent application data is stored in the database.
  The database server only accepts requests from the application server, and does not transfer any significant amount of data to/from any other server.
  Using the bytes sent/received by the database server, we can account for some of the bytes sent/received by the app server. Subtracting the data transferred to/from the database:

TABLE 12

| Server | Bytes Sent | Bytes Received |
|---|---|---|
| App Server | 25,000 | 90,000 |
| Database Server | 50,000 | 10,000 |

Note that we subtracted the bytes received by the database from the bytes sent by the application server, and vice versa. We presume that the remaining bytes were sent and received by the web server communicating with the application server.

Now, we repeat the process the process with the next highest tier: the web server:

TABLE 13

|  | Bytes Sent | Bytes Received |
|---|---|---|
| web | 110,000 | 45,000 |
| app | 25,000 | 90,000 |
| database | 50,000 | 10,000 |

This table represents the amount of data (in bytes) that was sent by each server to the next highest tier, and the amount of data (in bytes) that was received by each server from the next highest tier.

Returning to FIG. 5, at step 539 the method requires assembling the transaction flow and network throughput into a final instruction set for the discrete event simulator. This provides the final amount of information needed to complete the set of instructions for the discrete event simulator for each transaction.

In the instant linear example:

TABLE 14

| Server Name | Resource consumption to be simulated |
|---|---|
| client | Send 45,000-byte request to web server |
| web | Consume 0.010 seconds of CPU |
| web | Perform 10 disk read operations, reading 512 bytes each time |
| web | Perform 1 disk write operation, writing 512 bytes each time |
| web | Send 90,000-byte request to application server |
| app | Consume 0.030 seconds of CPU |

TABLE 14-continued

| Server Name | Resource consumption to be simulated |
|---|---|
| app | Perform 5 disk read operations, reading 256 bytes each time |
| app | Send 10,000-byte request to database server |
| database | Consume 0.020 seconds of CPU |
| database | Perform 100 disk read operations, reading 650 bytes each time |
| database | Perform 200 disk write operations, writing 500 bytes each time |
| database | Send 50,000-byte reply to app server |
| app | Send 25,000-byte reply to web server |
| web | Send 110,000-byte reply to client |

The invention claimed is:

1. A non-transitory computer readable medium containing a computer program product storing a set of computer executable instructions, the set of computer executable instructions operable on a host computer system, including a CPU, that when executed creates a discrete event simulation model of a production network including a client and a plurality of servers on a plurality of network tiers connected by a network, the plurality of servers executing a plurality of applications, and running a business function, the set of computer executable instructions including the steps of:

executing the business function, including accessing a plurality of applications running on the production network, from the client on the production network;

gathering resource utilization data from the plurality of servers in a set of reporting intervals;

normalizing the resource utilization data by performing the substeps of: synchronizing the resource utilization data by correlating a set of timestamp data, adjusting the resource utilization data for consistent physical units, extrapolating the resource utilization data in the set of reporting intervals into a set of equalized time intervals, aggregating the resource utilization data for the plurality of servers into an aggregated resource utilization for each network tier in the plurality of network tiers;

calculating an aggregated resource consumption in a measurement time period by multiplying the aggregated resource utilization by the measurement time period for each network tier in the plurality of network tiers;

estimating a set of transaction cost from the aggregated resource consumption;

building a discrete event simulation model from the set of transaction cost; and, storing the discrete event simulation model on the non-transitory computer readable medium.

2. The non-transitory computer readable medium of claim 1 wherein the step of gathering further comprises the steps of:

deploying one of a plurality of resource monitors on each server resident on the production network;

collecting the resource utilization data from the plurality of resource monitors including collecting the set of time stamp data; and merging the resource utilization data into a single file for analysis.

3. The non-transitory computer readable medium of claim 2 wherein the step of building a discrete event simulation model further comprises the steps of:

assembling a set of simulation instructions incorporating the set of transaction costs;

approximating a flow of a transaction associated with the business function;

calculating data throughput on a network interface of the production network; and assembling the approximated flow of a transaction and the calculated data throughput into the set of simulation instructions.

4. The non-transitory computer readable medium of claim 1 wherein the plurality of network tiers includes a first network tier comprising a set of web servers, a second network tier comprising a set of application servers and a third network tier comprising a set of database servers.

5. The non-transitory computer readable medium of claim 4 wherein the step of approximating a flow of a transaction further comprises the steps of:

aggregating a first set of servers into a first combined tier of servers in the plurality of servers;

aggregating a second set of servers into a second combined tier of servers in the plurality of servers; and, approximating the flow of a transaction between the first combined tier of servers and the second combined tier of servers.

6. The non-transitory computer readable medium of claim 4 wherein the step of calculating data throughput further comprises the step of:

repeating the step of calculating the aggregated resource consumption for a set of measurement time periods and accumulating a running total of consumption of resources for each network tier in the plurality of network tiers.

7. The non-transitory computer readable medium of claim 1 wherein the step of estimating a set of transaction cost further comprises the step of:

counting a number of transactions performed during the measurement time period;

dividing the aggregated resource consumption by the counted number of transactions.

8. The non-transitory computer readable medium of claim 1 comprising the further step of:

running the discrete event simulation model on a discrete event simulation modeler.

9. The non-transitory computer readable medium of claim 8 wherein the number of transactions is derived from a transaction log.

10. The non-transitory computer readable medium of claim 8 wherein the number of transactions is derived from a load test.

11. The non-transitory computer readable medium of claim 3 wherein the step of approximating a flow of a transaction further comprises the steps of:

assuming an iteration count between at least two alternate paths on the non-linear production network;

assigning weights to each of the at least two alternate paths on the non-linear production network based on the iteration count; and within a simulation, allocating the aggregated resource consumption among the at least two alternate paths according to the assigned weights.

12. A non-transitory computer readable medium containing a computer program product storing a set of computer executable instructions, the set of computer executable instructions operable on a host computer system, including a CPU, that when executed creates a discrete event simulation model comprising the program steps of:

gathering resource data from a plurality of resource monitors operatively disposed on a plurality of servers resident on a multi-tiered computer system executing a business function;

the business function accessing a plurality of applications running on the multi-tiered computer system;

wherein the resource data includes a set of reporting intervals, a set of timestamps, a resource utilization, a received packet count and a sent packet count;

equalizing at least one reporting interval in the resource data by extrapolating the resource data in the set of reporting intervals into a set of equalized time intervals;

synchronizing at least one time stamp in the set of timestamps;

normalizing at least one set of units in the resource data;

selecting a subset of the plurality of servers;

calculating a resource consumption for the plurality of servers as a combined resource consumption for the subset of the plurality of servers wherein the combined resource consumption is calculated by multiplying the resource utilization by a measured time period;

calculating a transaction cost from the combined resource consumption;

approximating a transaction flow for a plurality of transactions related to the business function;

calculating a network throughput between the plurality of servers; and building a discrete event simulation model from the transaction cost, the transaction flow and the network throughput; and storing the discrete event simulation model on the non-transitory computer readable medium.

13. The non-transitory computer readable medium of claim 12 wherein the steps of selecting a subset of the plurality of servers, calculating a resource consumption, calculating a transaction cost, approximating a transaction flow, calculating a network throughput, building a discrete event simulation model and storing the discrete event simulation model are repeated for a set of web servers, a set of application servers and a set of database servers in the plurality of servers.

14. The non-transitory computer readable medium of claim 12 wherein the program step of approximating a transaction flow comprises the further program step of:

estimating the transaction flow of a linear multi-tiered system.

15. The non-transitory computer readable medium of claim 12 wherein the program step of approximating a transaction flow comprises the further program step of:

estimating the transaction flow of a non-linear multi-tiered system.

16. The non-transitory computer readable medium of claim 15 wherein the program step of estimating the transaction flow of a non-linear multi-tiered system comprises the further program step of:

performing a discrete event simulation by weighting a set of alternate paths on the multi-tiered system based on a percentage of usage of each path in the set of alternate paths.

17. A system for creating a discrete event simulation model, comprising an analysis computer communicatively connected to a multi-tiered computer system, the multi-tiered computer system executing a business function, the analysis computer programmed to perform the steps of:

gathering a set of resource data from a plurality of resource monitors operatively disposed on a plurality of servers resident on each tier of the multi-tiered computer system;

the business function accessing a plurality of applications running on the multi-tiered computer system;

wherein the set of resource data includes a set of reporting intervals, a set of timestamps, a resource utilization, a received packet count and a sent packet count;

equalizing at least one reporting interval in the resource data by extrapolating the resource data in the set of reporting intervals into a set of equalized time intervals;

synchronizing at least one time stamp in the set of timestamps;

normalizing at least one set of units in the resource data;

calculating a resource consumption for each tier of the multi-tiered computer system by multiplying the resource utilization by a reporting time interval in the set of reporting intervals;

calculating a transaction cost from the resource consumption;

approximating a transaction flow for a plurality of transactions related to the business function;

calculating a network throughput between the plurality of servers; and building a discrete event simulation model from the transaction cost, the transaction flow and the network throughput; and executing the discrete event simulation model on the analysis computer.

18. The computer system of 17 wherein the step of calculating the resource consumption for the plurality of servers further comprises interpolating a at least one resource utilization value from the set of resource data for the at least one reporting interval.

19. The computer system of claim 17 wherein the step of normalizing further comprises aggregating resource data from the plurality of servers, residing on each tier of the multi-tiered computer system, into a single server model.

20. The computer system of claim 17 including the steps of selecting a set of web servers as a first tier of the multi-tiered computer system, selecting a set of application servers as a second tier in the multi-tiered computer system and selecting a set of database servers as a third tier in the multi-tiered computer system.

* * * * *